United States Patent
Gebregergis et al.

(10) Patent No.: US 9,263,982 B2
(45) Date of Patent: Feb. 16, 2016

(54) MOTOR CONTROL SYSTEM HAVING COMMON-MODE VOLTAGE COMPENSATION

(71) Applicants: Abraham G. Gebregergis, Saginaw, MI (US); Ramakrishnan RajaVenkitasubramony, Saginaw, MI (US); Tomy Sebastian, Saginaw, MI (US); Santhosh J. Veigas, Saginaw, MI (US); Vaughn E. Lietzke, Auburn, MI (US)

(72) Inventors: Abraham G. Gebregergis, Saginaw, MI (US); Ramakrishnan RajaVenkitasubramony, Saginaw, MI (US); Tomy Sebastian, Saginaw, MI (US); Santhosh J. Veigas, Saginaw, MI (US); Vaughn E. Lietzke, Auburn, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 160 days.

(21) Appl. No.: 13/833,354

(22) Filed: Mar. 15, 2013

(65) Prior Publication Data
US 2014/0265986 A1    Sep. 18, 2014

(51) Int. Cl.
*H02P 6/00*    (2006.01)
*H02P 23/00*    (2006.01)
*H02P 21/00*    (2006.01)

(52) U.S. Cl.
CPC ............ *H02P 23/00* (2013.01); *H02P 21/0035* (2013.01); *H02P 23/0027* (2013.01)

(58) Field of Classification Search
CPC ...................................................... H02P 21/00
USPC .......... 318/493, 494, 400.01, 700, 400.1, 720
See application file for complete search history.

(56) References Cited

U.S. PATENT DOCUMENTS

| | | | | |
|---|---|---|---|---|
| 5,043,642 | A * | 8/1991 | Ohi | 318/400.17 |
| 5,479,090 | A * | 12/1995 | Schultz | 323/284 |
| 5,740,040 | A * | 4/1998 | Kifuku et al. | 701/41 |
| 6,204,719 | B1 * | 3/2001 | Gilbert | 327/349 |
| 6,262,546 | B1 * | 7/2001 | Draves et al. | 318/293 |
| 6,452,405 | B1 * | 9/2002 | Collier-Hallman | 324/713 |
| 6,549,057 | B1 * | 4/2003 | Gilbert | 327/349 |
| 6,806,744 | B1 * | 10/2004 | Bell et al. | 327/70 |
| 7,075,290 | B2 * | 7/2006 | Collier-Hallman et al. | 324/163 |
| 8,207,698 | B2 * | 6/2012 | Xiang | 318/716 |
| 8,362,733 | B2 * | 1/2013 | Inuduka et al. | 318/494 |

* cited by examiner

Primary Examiner — Rita Leykin
(74) Attorney, Agent, or Firm — Cantor Colburn LLP

(57) ABSTRACT

A motor control system is provided, and includes a motor, at least one differential amplifier configured to monitor phase current applied to the motor, and a current compensation controller. The current compensation controller is in communication with the at least one differential amplifier, and is configured to periodically determine a common-mode voltage of the at least one differential amplifier. The current compensation controller is also configured to determine a corrected phase current value based on the common mode voltage.

4 Claims, 3 Drawing Sheets

US 9,263,982 B2

MOTOR CONTROL SYSTEM HAVING COMMON-MODE VOLTAGE COMPENSATION

FIELD OF THE INVENTION

The present invention relates to a control system for a motor, and more particularly to a control system for a motor that determines a corrected phase current value based on a common-mode voltage of a differential amplifier.

BACKGROUND OF THE INVENTION

Closed loop current mode control of a permanent magnet synchronous motor (PMSM), a surface permanent magnet (SPM) motor, or an interior permanent magnet (IPM) motor generally requires relatively accurate measurement of the phase current in order to maintain torque ripple created by the motor within specific limits. The phase current may be measured using a precision shunt resistor and a current sense differential amplifier. However, differential amplifiers not only amplify the differential voltage, but also some amount of common-mode voltage at the inputs. Therefore, when the phase current is calculated using the output voltage of the differential amplifier, the resulting current measurement has error due to the common-mode voltage present at the inputs at the time of the measurement.

If an anti-alias filter is used at the output of the differential amplifier, the effects of the common-mode voltage will vary as a function of a pulse width modulation (PWM) cycle. It should also be noted that the amount of common-mode voltage varies from part to part, and may be different depending on a specific differential amplifier. All of these factors present challenges when attempting to compensate for the common-mode voltage in a differential amplifier.

SUMMARY OF THE INVENTION

In one embodiment, a motor control system is provided, and includes a motor, at least one differential amplifier configured to monitor phase current applied to the motor, and a current compensation controller. The current compensation controller is in communication with the at least one differential amplifier, and is configured to periodically determine a common-mode voltage of the at least one differential amplifier. The current compensation controller is also configured to determine a corrected phase current value based on the common mode voltage.

In another embodiment, a method of controlling a motor, is provided. The method includes periodically determining a common-mode voltage of at least one differential amplifier by a current compensation controller. The at least one differential amplifier is configured to monitor phase current applied to the motor. The method includes determining a corrected phase current value based on the common mode voltage by the current compensation controller.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
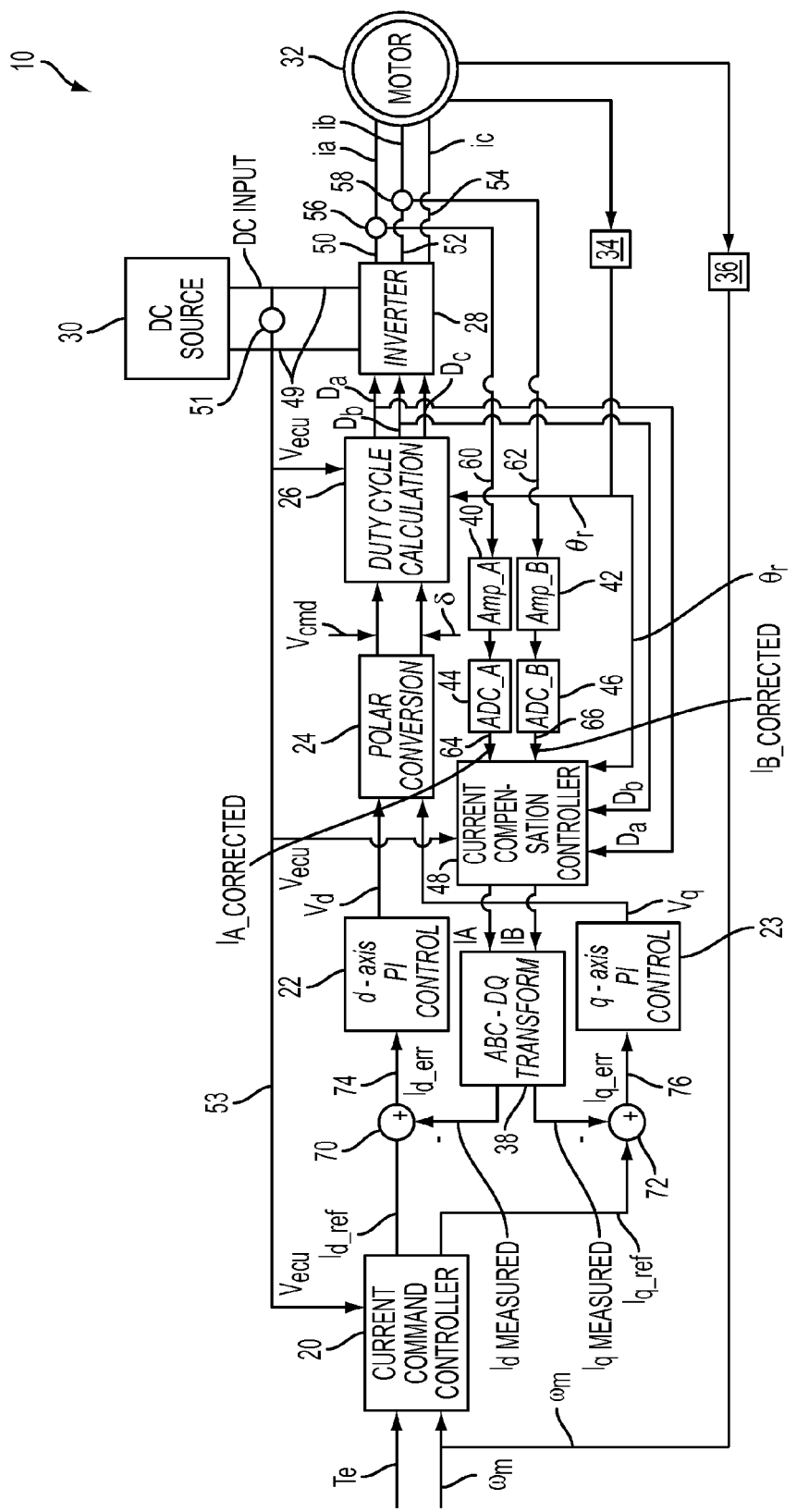
FIG. 1 is a block diagram of a motor control system in accordance with an exemplary embodiment of the invention.

Referring now to the Figures, where the invention will be described with reference to specific embodiments, without limiting same, FIG. 1 is an exemplary block diagram of a motor control system 10. The motor control system 10 includes a command current controller 20, a d-axis proportional plus integral gain (PI) controller 22, a q-axis PI controller 23, a polar conversion controller 24, a duty cycle calculation controller 26, an inverter 28, a DC power source 30, a motor 32, a position sensor 34, a speed sensor 36, a transform controller 38, an a-axis differential amplifier 40 (the differential amplifier may also be referred to as an operational amplifier), a b-axis differential amplifier 42, an a-axis analog to digital converter (ADC) 44, a b-axis ADC 46, and a current compensation controller 48. In one embodiment, the motor 32 may be a permanent magnet synchronous motor (Surface permanent magnet (SPM) motor or an interior permanent magnet (IPM) motor) motor, however it is to be understood that any type of electric motor that is controlled using phase current may be used as well.

In the embodiment as shown in FIG. 1, the inverter 28 is connected to the DC power source 30, where the DC power source 30 may be, for example, a battery. The DC power source 30 may be connected to the inverter 28 by DC input lines 49. A transducer 51 may be used to monitor a bridge voltage $V_{ecu}$ across the DC input lines 49. A control signal 53 representing the bridge voltage $V_{ecu}$ may be sent to the command current controller 20 and the duty cycle calculation controller 26. In the exemplary embodiment as shown, the inverter 28 transmits three alternating current (AC) phase currents to the motor 32 (e.g., $i_a$, $i_b$, and $i_c$) by line 50, line 52, and line 54 for operation and control of the motor 32.

For feedback control purposes, the phase currents $i_a$ and $i_b$ transmitted to the motor 32 by lines 50 and 52 may be detected to determine the instantaneous current flow to the motor 32. Specifically, a transducer 56 may be used to monitor the phase current $i_a$ on the line 50, and a transducer 58 may be used to monitor the phase current $i_b$ on the line 52. It should be noted that although transducer 56 and transducer 58 are illustrated, only one of the lines 50 or 52 may be monitored to measure either phase current $i_a$ or phase current $i_b$. A control signal 60 representing the measured phase current $i_a$ may be sent to the a-axis differential amplifier 40 from the transducer 56, and a control signal 62 representing the measured phase current $i_b$ may be sent to the b-axis differential amplifier 42 from the transducer 58. An augmented or amplified value of the phase current $i_a$ is then sent to the a-axis ADC 44 from the a-axis differential amplifier 40, and an amplified value of the phase current $i_b$ 62 is sent to the b-axis ADC 46 from the b-axis differential amplifier 42. The a-axis ADC 44 converts the amplified value of the phase current $i_a$ into a digital value

64. The digital value 64 represent the magnitude of the phase current $i_a$. The b-axis ADC 46 converts the amplified value of the phase current $i_b$ into a digital value 66. The digital value 66 represents the magnitude of the phase current $i_b$.

The current compensation controller 48 receives as input the digital value 64 from the ADC 44 and the digital value 66 from the ADC 46 (which represent the phase current $i_a$ on the line 50 and the phase current $i_b$ on the line 52, respectively), the bridge voltage $V_{ecu}$, and duty cycle values $D_a$ and $D_b$ from the duty cycle calculation controller 26. The duty cycle calculation controller 26 generates the duty cycles values $D_a$ and $D_b$ (the duty cycle values $D_a$ and $D_b$ are described in detail below). The current compensation controller determines a corrected a-axis phase current value $I_{A\_CORRECTED}$ and a corrected b-axis phase current value $I_{B\_CORRECTED}$, which is described in detail below. The corrected a-axis phase current value $I_{A\_CORRECTED}$ compensates for offset voltage error in current measurement due to common-mode voltage in the a-axis differential amplifier 40, and the corrected b-axis phase current value $I_{B\_CORRECTED}$ compensates for offset voltage error due to common-mode voltage in the b-axis differential amplifier 42.

The transform controller 38 receives as input corrected a-axis phase current value $I_{A\_CORRECTED}$ and the corrected b-axis phase current value $I_{B\_CORRECTED}$ from the current compensation controller 48. In one embodiment, the transform controller 38 is a three-phase to two-phase transformation controller where measured values for the AC current (e.g., the input corrected a-axis phase current value $I_{A\_CORRECTED}$ and the corrected b-axis phase current value $I_{B\_CORRECTED}$) are converted into equivalent measured currents, which are a measured d-axis current $I_{dMEASURED}$ and a measured q-axis current $I_{qMEASURED}$. The measured d-axis current $I_{dMEASURED}$ is sent to a subtractor 70 and the measured q-axis current $I_{qMEASURED}$ is sent to a subtractor 72.

The command current controller 20 receives as input a torque reference command $T_e$, an angular speed $\omega_m$, and the control signal 53 representing the bridge voltage $V_{ecu}$ from the transducer 51. The torque reference command $T_e$ represents a commanded torque value, and may be derived from another controller (not shown), or may correspond to a torque value generated by an operator. The angular speed $\omega_m$ is measured by the speed sensor 36. The speed sensor 36 may include, for example, an encoder and a speed calculation circuit for calculating the angular speed of a rotor (not shown) of the motor 32 based on a signal received by the encoder. The command current controller 20 calculates a reference d-axis current $I_{d\_REF}$ and a reference q-axis current $L_{q\_REF}$ based on the torque command $T_e$, the bridge voltage $V_{ecu}$, and the angular speed $\omega_m$. For example, in one embodiment, the reference d-axis current $I_{d\_REF}$ and the reference q-axis current $I_{q\_REF}$ may be calculated using a look-up table. However, it is understood other approaches may be used as well to determine the reference d-axis current $I_{d\_REF}$ and the reference q-axis current $I_{q\_REF}$. The reference d-axis current $I_{d\_REF}$ is sent to the subtractor 70, and the reference q-axis current $L_{q\_REF}$ is sent to the subtractor 72.

The subtractor 70 receives the measured d-axis current $I_{dMEASURED}$ and the reference d-axis current $I_{d\_REF}$. The subtractor 70 determines a d-axis error signal 74 based on the measured d-axis current $I_{dMEASURED}$ and the reference d-axis current $I_{d\_REF}$. The d-axis error signal 74 represents the error between the measured d-axis current $I_{dMEASURED}$ and the reference d-axis current $I_{d\_REF}$. The subtractor 72 receives the measured q-axis current $I_{qMEASURED}$ and the reference q-axis current $I_{q\_REF}$. The subtractor 72 determines a q-axis error signal 76 based on the measured q-axis current $I_{qMEASURED}$ and the reference q-axis current $I_{q\_REF}$. The q-axis error signal 76 represents the error between the measured q-axis current $I_{qMEASURED}$ and the reference q-axis current $I_{q\_REF}$.

The d-axis PI controller 22 receives as input the d-axis error signal 74 from the subtractor 70. The d-axis PI controller 22 calculates a d-axis voltage signal $V_D$. The d-axis voltage signal $V_D$ is based on a d-axis proportional gain $K_P$, and a d-axis integral gain $K_i$. Likewise, the q-axis PI controller 23 receives as input the q-axis error signal 76 from the subtractor 72. The q-axis PI controller 23 calculates a q-axis voltage signal $V_Q$. The q-axis voltage signal $V_Q$ is based on a q-axis proportional gain $K_P$, and a q-axis integral gain K.

The polar conversion controller 24 receives as input the d-axis voltage signal $V_D$ from the d-axis PI controller 22 and the q-axis voltage signal $V_Q$ from the q-axis PI controller 23. Based on the inputs, the polar conversion controller 24 determines a voltage command $V_{cmd}$ and a phase advance angle $\delta$. The duty cycle calculation controller 26 receives as inputs the voltage command $V_{cmd}$ and the phase advance angle $\delta$ from the polar conversion controller 24. The duty cycle calculation controller 26 also receives a rotor angle value $\theta_r$ measured by the motor position sensor 34. In one exemplary embodiment, the duty cycle calculation controller 26 may include an over-modulation space vector PWM unit to generate three respective duty cycle values $D_a$, $D_b$, and $D_c$. The duty cycle values $D_a$, $D_b$, and $D_c$ are used to drive gate drive circuits (not shown) of the inverter 28 that energize phases of the of the motor 32.

Figure 2:
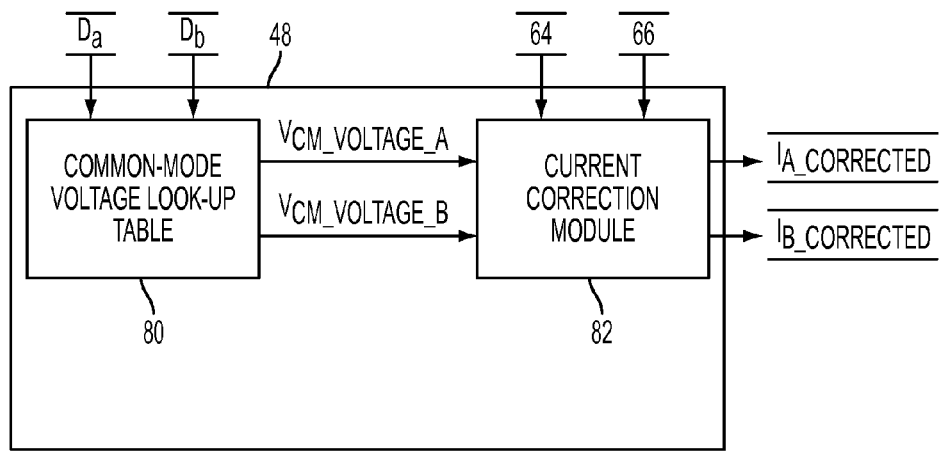
FIG. 2 is a dataflow diagram illustrating an exemplary current compensation controller, in accordance with another exemplary embodiment of the invention.

Determining the corrected a-axis phase current value $I_{A\_CORRECTED}$ and the corrected b-axis phase current value $I_{B\_CORRECTED}$ by the current compensation controller 48 will now be discussed. Turning now to FIG. 2, a dataflow diagram illustrates one exemplary embodiment of the current compensation controller 48 of FIG. 1 used to determine the corrected a-axis phase current value $I_{A\_CORRECTED}$ and the corrected b-axis phase current value $I_{B\_CORRECTED}$. In one example, the current compensation controller 48 includes a common-mode voltage look-up table 80, and a current correction module 82.

The common-mode voltage look-up table 80 stores values for an offset voltage from the a-axis differential amplifier 40, and an offset voltage from the b-axis differential amplifier 42. Specifically, the common-mode voltage look-up table 80 stores data collected during an end-of-line test of the motor control system 10. Specifically, during production, the motor control system 10 is operated at an end-of-line calibration. During end-of-line calibration, values for the offset voltage based on the duty cycle are generated and stored in memory of the current compensation controller 48 as the common-mode voltage look-up table 80.

Figure 3:
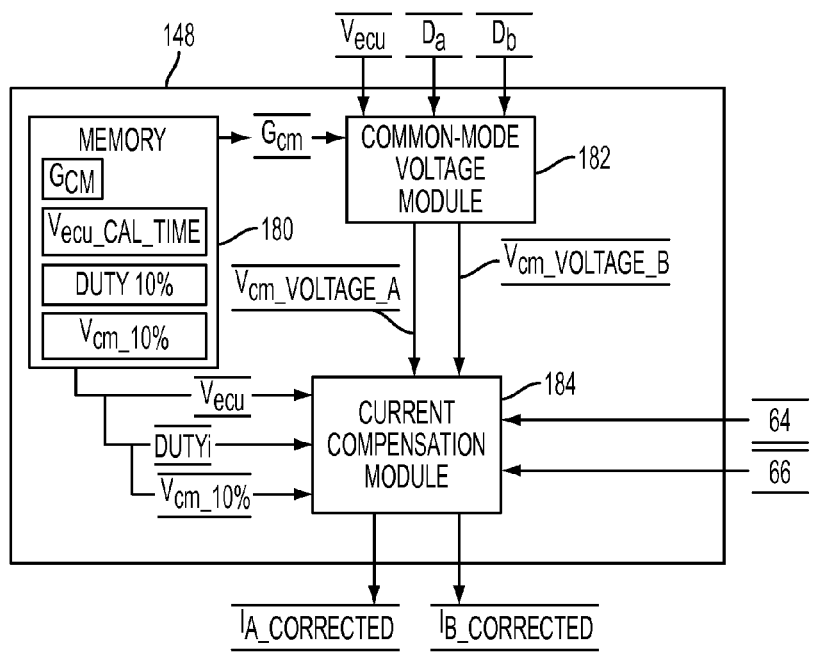
FIG. 3. is an alternative embodiment of a dataflow diagram illustrating an exemplary current compensation controller, in accordance with yet another exemplary embodiment of the invention.
Figure 4:
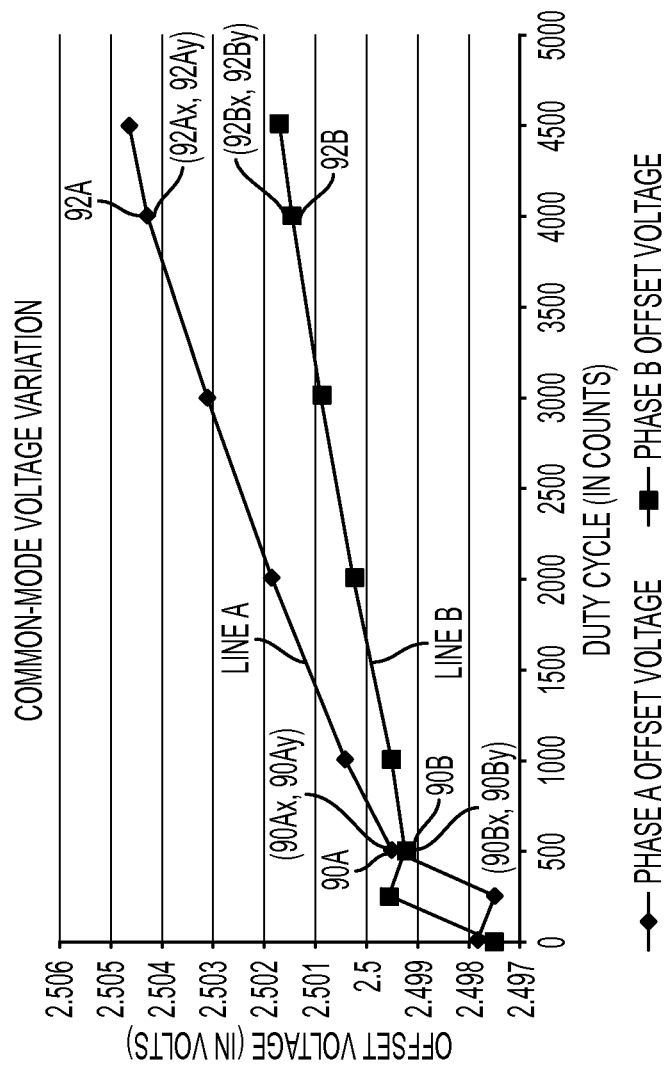
FIG. 4 is an exemplary look-up table generated during an end-of-line calibration, in accordance with another exemplary embodiment of the invention.

FIG. 4 is an exemplary illustration of the common-mode voltage look-up table 80 generated during end-of-line calibration. In the embodiment as shown in FIG. 3, the x-axis is the duty cycle (measured in counts) of the duty cycle $D_a$ or duty cycle $D_b$, and the y-axis represents the offset voltage. Specifically, Line A represents the offset voltage for the a-axis differential amplifier 40 (FIG. 1), and Line B represents the offset voltage for the b-axis differential amplifier 42 (FIG. 1). It should be noted that although values for both the a-axis differential amplifier 40 and the b-axis differential amplifier 42 are illustrated, only values corresponding to one of the differential amplifiers 40 or 42 may be stored in the common-mode voltage look-up table 80 as well.

Referring now to both FIGS. 2 and 4, the common-mode voltage look-up table provides an a-axis common-mode voltage $V_{CM\_VOLTAGE\_A}$ based on the duty cycle $D_a$, and/or a b-axis common mode voltage $V_{CM\_VOLTAGE\_B}$ based on the duty cycle $D_b$. For example, referring to FIG. 4, if the duty cycle value is about 500 counts (10% duty cycle) for the a-axis differential amplifier 40, then the a-axis common-mode voltage $V_{CM\_VOLTAGE\_A}$ is about 2.499 Volts. The value of the a-axis common-mode voltage $V_{CM\_VOLTAGE\_A}$ and/or the b-axis common mode voltage $V_{CM\_VOLTAGE\_B}$ is then sent to the current correction module 82.

The current correction module 82 also receives as input the digital value 64 from the ADC 44 (shown in FIG. 1) and/or the digital value 66 from the ADC 46 (also shown in FIG. 1), which represent the phase current $i_a$ on the line 50 and the phase current $i_b$ on the line 52, respectively. The current correction module 82 may then periodically determine the corrected a-axis phase current value $I_{A\_CORRECTED}$ and/or the corrected b-axis phase current value $I_{B\_CORRECTED}$ based on the inputs. In one embodiment, the corrected a-axis phase current value $I_{A\_CORRECTED}$ and/or a corrected b-axis phase current value $I_{B\_CORRECTED}$ may be determined by Equation 1:

$$I_{CORRECTED} = (ADC_{mtr\_curr\_volts} - V_{CM\_Voltage}) * Gain_{Amps\_per\_Volt} \quad \text{Equation 1}$$

where $I_{CORRECTED}$ is either the corrected a-axis phase current value $I_{A\_CORRECTED}$ or the corrected b-axis phase current value $I_{B\_CORRECTED}$, $ADC_{mtr\_curr\_volts}$ is the output of either the ADC 44 or the ADC 46 shown in FIG. 1 (i.e., either the phase current $i_a$ or the phase current $i_b$), and $Gain_{Amp\_per\_volt}$ is a gain parameter that is used to convert the voltage into current.

FIG. 3 is an alternative embodiment of a current compensation controller 148 including memory 180, a common-mode voltage module 182, and a current correction module 184. The memory 180 stores a gain common-mode value $G_{cm}$, the bridge voltage $V_{ecu\_Cal\_Time}$, a 10% duty cycle $duty_{10\%}$, and a common-mode voltage $V_{CM(10\%\ dutyCycle)}$. $V_{ecu,calTime}$ represents the bridge voltage measured during end-of-line calibration, $duty_{10\%}$ represents a 10% duty cycle during end-of-line calibration, and $V_{CM(10\%\ dutycycle)}$ represents the common-mode voltage during end-of-line calibration at 10% duty cycle. The gain common-mode value $G_{cm}$ is calculated by the current compensation controller 182 during end-of-line calibration of the motor control system 10 (FIG. 1), and is stored in the memory 180 of the current compensation controller 148.

An exemplary approach to determine the gain common-mode value $G_{cm}$ will now be described. Referring now to both FIGS. 3 and 4, Line A represents the offset voltage created the a-axis differential amplifier 40 (FIG. 1) during end-of line calibration, and Line B represents the offset voltage created by the b-axis differential amplifier 42 (FIG. 1) during end-of-line calibration. A first point of data 90A and a second point of data 92A are sampled for the a-axis differential amplifier 40, and a first point of data 90B and a second point of data 92B are sampled for the b-axis differential amplifier 42. The first point of data 90A and the second point of data 92A are used to determine a slope m of Line A (where the equation of a line is expressed as y=mx+b, and m is the slope). Likewise, the first point of data 90B and the second point of data 92B are used to determine a slope m of Line B. The first points of data 90A and 90B may be taken during a beginning portion of the duty cycle. For example, in the embodiment as shown, the first points of data 90A and 90B are taken at 500 counts (at about 10% duty cycle). The second points of data 92A and 92B are taken during an end portion of the duty cycle. For example, in the embodiment as shown, the second points of data 92A and 92B are taken at 4000 counts (at about 80% duty cycle). While 500 counts and 4000 counts are disclosed, it is to be understood that other values of the duty cycle may be used as well to determine the slope of either Line A or Line B to best fit the system to this linear question.

The values for the first points of data 90A or 90B may be expressed as $(90A_x, 90A_y)$ or $(90B_x, 90B_y)$, where the x coordinate represents the duty cycle count and the y coordinate represents the offset voltage. The values for the second points of data 92A or 92B may be expressed as $(92A_x, 92A_y)$ or $(92B_x, 92B_y)$. The current compensation controller 182 determines the gain common-mode value $G_{cm}$ for the a-axis amplifier 40 (FIG. 1) based on the first point of data 90A and the second point of data 92A. Alternatively, or in addition to the a-axis amplifier 40, the current compensation controller 182 determines the gain common-mode value $G_{cm}$ for the b-axis amplifier 42 (FIG. 1) based on the first point of data 90B and the second point of data 92B. Specifically, the gain common-mode value $G_{cm}$ represents the slope m of either Line A or Line B (e.g., for either the a-axis differential amplifier 40 and the b-axis differential amplifier 42), where the a-axis gain common-mode value $G_{CM\_A}$ determined by Equation 2 and the b-axis gain common-mode value $G_{CM\_B}$ is determined by Equation 3:

$$G_{CM\_A} = \frac{92\,A_y - 90\,A_y}{92\,A_x - 90\,A_x} \quad \text{Equation 3}$$

$$G_{CM\_B} = \frac{92\,B_y - 90\,B_y}{92\,B_x - 90\,B_x} \quad \text{Equation 4}$$

where the value of $92A_x$-$90A_x$ and $92B_x$-$92B_x$ are multiplied by the bridge voltage $V_{ecu}$ measured during end-of-line calibration to convert the values from duty cycle to equivalent voltage values.

Turning back to FIG. 3, the gain common-mode value $G_{cm}$ is sent to the common-mode voltage module 182. The common-mode voltage module 182 also receives as input the bridge voltage $V_{ecu}$, the duty cycle value (e.g., $D_a$ and/or $D_b$) during operation, the bridge voltage $V_{ecu}$, stored in memory during end-of-line calibration, and the duty cycle value duty, stored during end-of-line calibration. The common-mode voltage module 182 determines a common-mode voltage (either an a-axis common mode voltage $V_{CM\_VOLTAGE\_A}$ and/or a b-axis common mode voltage $V_{CM\_VOLTAGE\_B}$) periodically during operation of the motor control system 10. The a-axis common-mode voltage $V_{CM\_VOLTAGE\_A}$ represents the common-mode voltage of the a-axis differential amplifier 40, and the b-axis common mode voltage $V_{CM\_VOLTAGE\_B}$ represents the common-mode voltage of the b-axis differential amplifier 42 (FIG. 1). In one embodiment, the common-mode voltage (either a-axis common-mode voltage $V_{CM\_VOLTAGE\_A}$ or the b-axis common mode voltage $V_{CM\_VOLTAGE\_B}$) is determined by Equation 5:

$$V_{CM\_VOLTAGE} = [G_{CM} * (V_{ecu} * D_i - V_{ecu,calTime} * duty_{10\%})] + V_{CM(10\%\ Dutycycle)} \quad \text{Equation 5}$$

where $V_{CM\_VOLTAGE}$ represents either the a-axis common-mode voltage or the b-axis common mode voltage, $V_{ecu}$ is the instantaneous bridge voltage that is measured during operation of the motor control system 10, $D_i$ is the instantaneous duty cycle (e.g., either $D_a$ and/or $D_b$) in counts commanded during operation of the motor control system 10, $V_{ecu,calTime}$ is the bridge voltage stored in the memory 180, $duty_{10\%}$ represents the 10% duty cycle during end-of-line calibration stored in memory 180, and $V_{CM(10\%\ DutyCycle)}$ represents the common-mode voltage of data points 90A (FIG. 4) and 90B (FIG. 4) captured and stored in memory 180 during end-of-line calibration.

The common-mode voltage $V_{CM\_VOLTAGE}$ is then sent to the current compensation module 184. The current compensation module 184 also receives as input the digital value 64 from the ADC 44 (shown in FIG. 1) and/or the digital value 66 from the ADC 46 (also shown in FIG. 1). The current compensation module 184 may then determine the corrected a-axis phase current value $I_{A\_CORRECTED}$ and/or the corrected b-axis phase current value $I_{B\_CORRECTED}$ based on the inputs using Equation 1 as described above.

Referring now to FIGS. 1-4, the current compensation module 48 and 148 as described above determines a corrected phase current that generally compensates for offset error due to common-mode voltage in the a-axis differential amplifier 40, the b-axis differential amplifier 42, or both the a-axis differential amplifier 40 and the b-axis differential amplifier 42. In particular, the current compensation module 48 and 148 may determine the corrected phase current value (the corrected a-axis phase current value $I_{A\_CORRECTED}$ and/or the corrected b-axis phase current value $I_{B\_CORRECTED}$) periodically. Thus, the approach as described above dynamically compensates for the offset voltage error caused by the differential amplifiers 40 and 42.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A motor control system, comprising:
   a motor;
   at least one differential amplifier configured to monitor phase current applied to the motor;
   a current compensation controller in communication with the at least one differential amplifier, the current compensation controller configured to:
   periodically determine a common-mode voltage of the at least one differential amplifier, the common-mode voltage is determined by:

$$V_{CM\_VOLTAGE} = [G_{CM} * (V_{ecu} * D_i - V_{ecu,calTime} * \text{duty}_{10\%})] + V_{CM(10\% DutyCycle)}$$

where $V_{CM\_VOLTAGE}$ represents the common-mode voltage, $G_{CM}$ is a gain common-mode value, $V_{ecu}$ is an instantaneous bridge voltage, $D_i$ is an instantaneous duty cycle, $V_{ecu,calTime}$ is a bridge voltage during end-of-line calibration, $\text{duty}_{10\%}$ represents a 10% duty cycle during end-of-line calibration, and $V_{CM(10\% DutyCycle)}$ represents the common-mode voltage during end-of-line calibration at 10% duty cycle; and determine a corrected phase current value based on the common mode voltage.

2. A motor control system, comprising:
   a motor;
   at least one differential amplifier configured to monitor phase current applied to the motor;
   a current compensation controller in communication with the at least one differential amplifier, the current compensation controller configured to:
   periodically determine a common-mode voltage of the at least one differential amplifier, the corrected the phase current value is determined by:

$$I_{CORRECTED} = (ADC_{mtr\_curr\_volts} - V_{CM\_Voltage}) * \text{Gain}_{Amps\_per\_Volt}$$

where $I_{CORRECTED}$ is either the corrected a-axis phase current value $I_{A\_CORRECTED}$ or the corrected b-axis phase current value $I_{B\_CORRECTED}$, $ADC_{mtr\_curt\_volts}$ represents the phase current monitored by the differential amplifier, and $\text{Gain}_{Amp\_per\_volt}$ is a gain parameter; and determine a corrected phase current value based on the common mode voltage.

3. A method of controlling a motor, comprising:
   periodically determining a common-mode voltage of at least one differential amplifier by a current compensation controller, at least one differential amplifier configured to monitor phase current applied to the motor, the common-mode voltage is determined by:

$$V_{CM\_VOLTAGE} = [G_{CM} * (V_{ecu} * D_i - V_{ecu,calTime} * \text{duty}_{10\%})] + V_{CM(10\% DutyCycle)}$$

where $V_{CM\_VOLTAGE}$ represents the common-mode voltage, $G_{CM}$ is a gain common-mode value, $V_{ecu}$ is an instantaneous bridge voltage, $D_i$ is an instantaneous duty cycle, $V_{ecu,calTime}$ is a bridge voltage during end-of-line calibration, $\text{duty}_{10\%}$ represents a 10% duty cycle during end-of-line calibration, and $V_{CM(10\% DutyCycle)}$ represents the common-mode voltage during end-of-line calibration at 10% duty cycle; and determining a corrected phase current value based on the common mode voltage by the current compensation controller.

4. A method of controlling a motor, comprising:
   periodically determining a common-mode voltage of at least one differential amplifier by a current compensation controller, at least one differential amplifier configured to monitor phase current applied to the motor, the corrected the phase current value is determined by:

$$I_{CORRECTED} = (ADC_{mtr\_curr\_volts} - V_{CM\_Voltage}) * \text{Gain}_{Amps\_per\_Volt}$$

where $I_{CORRECTED}$ is either the corrected a-axis phase current value $I_{A\_CORRECTED}$ or the corrected b-axis phase current value $I_{B\_CORRECTED}$, $ADC_{mtr\_curr\_volts}$ represents the phase current monitored by the differential amplifier, and $\text{Gain}_{Amp\_per\_volt}$ is a gain parameter; and determining a corrected phase current value based on the common mode voltage by the current compensation controller.

\* \* \* \* \*